Figure 1:
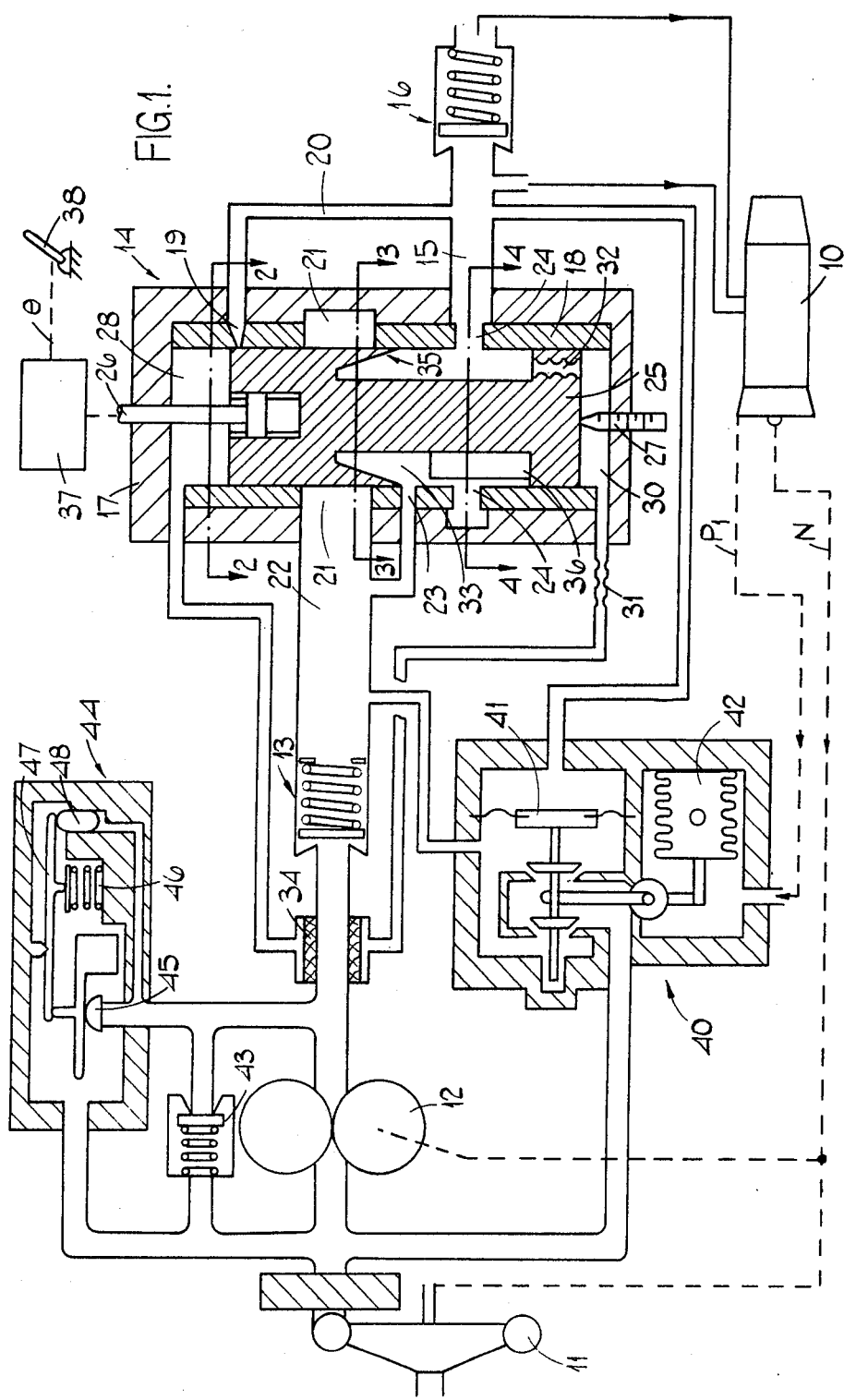

United States Patent [19]

Smith

[11] 4,040,599
[45] Aug. 9, 1977

[54] FLOW CONTROL VALVES FOR LIQUIDS

[75] Inventor: Trevor Stanley Smith, Sutton Coldfield, England

[73] Assignee: Lucas Industries Limited, Birmingham, England

[21] Appl. No.: 639,042

[22] Filed: Dec. 9, 1975

[30] Foreign Application Priority Data

Jan. 17, 1975 United Kingdom ............... 2206/75

[51] Int. Cl.² .......................................... F16K 31/124
[52] U.S. Cl. ............................... 251/28; 60/39.28 R; 137/47
[58] Field of Search ............... 251/28, 30, 35; 137/47, 137/58; 60/39.28 R

[56] References Cited

U.S. PATENT DOCUMENTS

| | | | |
|---|---|---|---|
| 2,687,273 | 8/1954 | Starkey | 251/28 |
| 2,879,643 | 3/1959 | Stroh et al. | 137/58 |
| 2,934,306 | 4/1960 | Evans et al. | 251/28 |
| 3,007,514 | 11/1961 | Werfs | 251/28 |
| 3,015,935 | 1/1962 | Evons | 251/28 |
| 3,130,740 | 4/1964 | Donlon | 60/39.28 R |
| 3,173,468 | 3/1965 | McCombs, Jr. | 60/39.28 R |
| 3,390,522 | 7/1968 | Whitehead | 60/39.28 R |
| 3,531,936 | 10/1968 | Widell | 60/39.28 R |
| 3,596,669 | 8/1971 | Alberani | 251/28 |

*Primary Examiner*—Martin P. Schwadron
*Assistant Examiner*—G. L. Walton

[57] ABSTRACT

A fluid flow control valve has a bore within which a control member is slidable in response to variations in a servo pressure signal. The control member is also rotatable and includes a relieved portion which co-operates with a control orifice to regulate said servo pressure signal. It is arranged that in a number of discrete rotational positions of the control member the control orifice is shut off to prevent sliding movement, whereby flow through the valve can be set to predetermined levels by rotation of the control element to these positions. In one rotational position all flow is shut off, independent of the sliding position of the control element.

14 Claims, 8 Drawing Figures

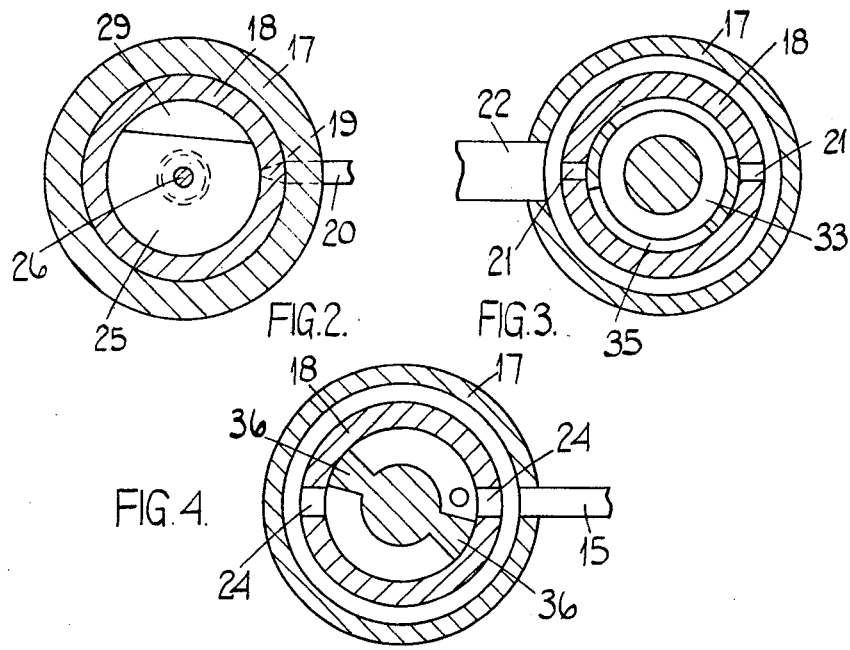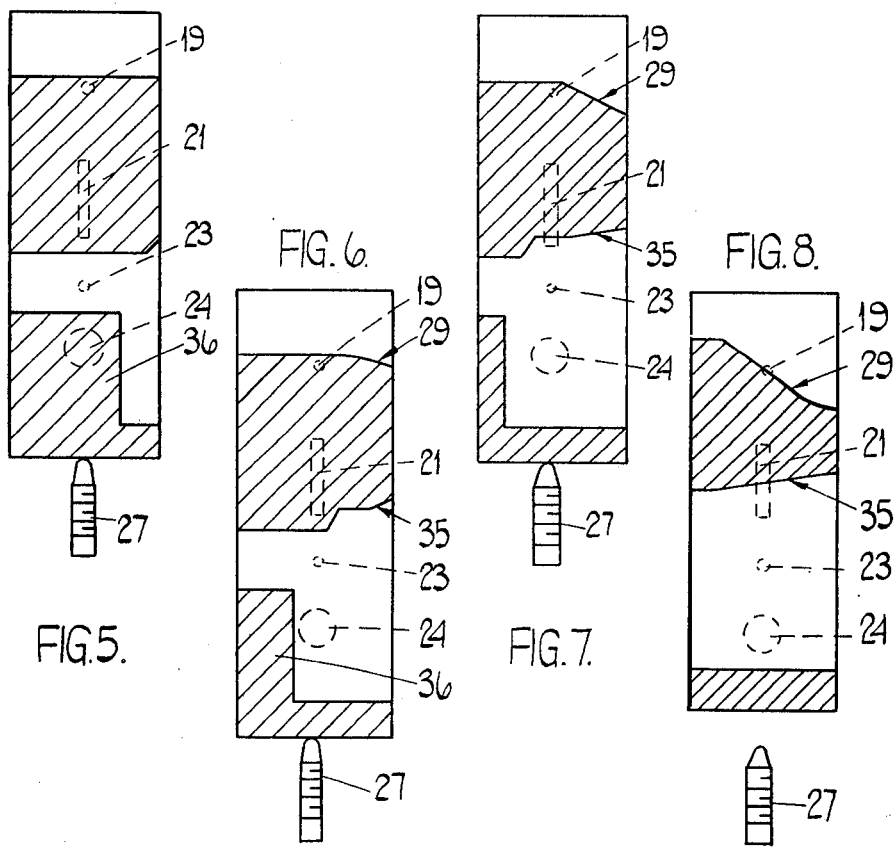

FLOW CONTROL VALVES FOR LIQUIDS

This invention relates to flow control valves for liquids.

According to the invention a flow valve for liquids comprises a body having an axial bore and an inlet port and an outlet port opening into said bore, a control member which is rotatable and axially slidable within said bore to control flow between said inlet and outlet ports, said control member being axially slidable in response to variations in a servo pressure signal, a control orifice in said body, and means for rotating said control member, said control member including a portion which co-operates with said control orifice to define a pilot valve for controlling said servo pressure signal, an increase or decrease in said servo pressure signal as a result of rotation of said control member causing the latter to be urged in respective directions which decrease and increase said servo pressure signal.

An example of the invention will now be described with reference to the accompanying drawings, in which:

FIG. 1 shows, diagrammatically, a fuel control system for a gas turbine engine, incorporating a flow control valve according to the invention, FIGS. 2, 3, and 4 are sections on corresponding lines in FIG. 1, and FIGS. 5, 6, 7 and 8 show the effects of metering profiles of the control valve, in respective positions of the valve control member.

As shown in FIGS. 1 to 4 fuel for a gas turbine engine 10 is delivered by a centrifugal boost pump 11 to a positive-displacement pump 12, both the pumps 11, 12 being driven from a shaft of the engine 10, rotating at a speed N.

Fuel is delivered to the engine 10 from the pump 11 via a first pressurizing valve 13 and a fluid flow control valve 14 arranged in series. Fuel flows directly from the outlet 15 of valve 14 to the pilot burners of the engine 10, and from outlet 15 to the main burners of the engine 10 via a second pressurizing valve 16.

Valve 14 has a body 17 which includes a ported sleeve 18. Sleeve 18 has a control orifice 19 which communicates via a passage 20 with the valve outlet 15. Sleeve 18 also has a pair of diametrically opposed second ports 21, both of which communicate with an inlet 22 of the valve 14. A third port 23 in sleeve 18 also communicates with the valve inlet 22. Finally, sleeve 18 has a pair of diametrically opposed fourth ports 24, both of which communicate with the valve outlet 15.

Slidable and rotatable within the sleeve 18 is a piston control member 25. Control member 25 is rotatable within sleeve 18 by means of a splined stem 26 on which control member 25 is freely axially slidable. Control member 25 is urged axially against an adjustable stop 27 by the pressure in a chamber 28, this pressure being derived from the output pressure of pump 12 via a filter unit 34.

The end of control member 25 which defines, in part, the chamber 28 has, as shown more clearly in FIGS. 6, 7 and 8, a relieved portion 29 which, in predetermined rotational positions of control member 25, co-operates with the orifice 19 to provide a pilot valve for controlling the pressure in chamber 28. Control member 25 is urged axially against the pressure in chamber 28 by the pressure in a chamber 30 at the other end of control member 25, chamber 30 being intermediate fluid flow restrictors 31, 32 connected in series between the filter unit 34 and the valve outlet 15.

Control member 25 has a central portion of reduced diameter which defines an annular passage 33 through which fuel can flow from inlet 21 to outlet 15. This central portion defines a metering edge 35 which co-operates with the ports 21 to control the rate of fuel flow therethrough. As shown more clearly in FIGS. 5 to 8, the metering edge 35 is profiled axially of control member 25 so that flow through the ports 21 is responsive to rotation of control member 25. The edge 35 comprises, in fact, two identical profiled parts which coact with respective ones of the ports 21.

The central portion of control member 25 is provided with a pair of lands 36 which in one rotational position of control member 25 shut off the outlet ports 24 in sleeve 18.

Operation of the valve 14 is as follows. In the shut position of the valve, indicated in FIG. 5, the lands 36 shut off ports 24. In this rotational position of control member 25 the orifice is also shut and the pressures in chambers 28 and 30 are equal to that at the outlet of pump 12. Control 25 may thus adopt any axial position within the sleeve 18, but its rotational position ensures that no fuel can flow to the engine 10.

Clockwise rotation of control member 25, as viewed in FIGS. 2 to 4, causes ports 24 to be opened. Orifice 19 and port 21 remain shut, as indicated in FIG. 6. This is the valve position drawn in FIGS. 1 to 4. In this position fuel can flow from inlet 22 to outlet 15 via the port 23. This flow being sufficient to permit light-up of the engine 10 to take place. The pressure at valve outlet 15 is, however, low, and the pressure in chamber 30 is thus also low. Control member 25 is thus urged against control stop 27.

Further clockwise rotation of control member 25, to the position indicated in FIG. 7, allows parts of the metering edge 35 of control member 25 to partly uncover the ports 21. In this rotational position of control member 25 the orifice 19 remains shut and member 25 thus remains in contact with the stop 27. Flow through the ports 21 is thus dependent on the setting of the stop 27 which is adjusted to provide sufficient fuel flow for engine idling.

Further clockwise rotation of control member 25, as indicated in FIG. 8, allows orifice 19 to be uncovered by the relieved portion 29. The resultant fall in the servo pressure in chamber 28 permits the control member 25 to move upwardly, as shown in FIG. 1, partly closing orifice 19 and raising the pressure in chamber 28 until equilibrium conditions are restored. As a result of this movement the profile 35 uncovers increasing amounts of port 21 to permit increased fuel flow to the engine 10. This fuel flow may thereby be controlled entirely by rotating the stem 26.

Stem 26 may be rotated by any convenient means, as for example, manually or by an electrical actuator 37 responsive to engine operating parameters and to the position $\theta$ of a power demand control 38 for the engine 10.

The fuel control system also includes a valve arrangement 40 which includes a diaphragm 41 responsive to the difference between the pressures of fuel at the inlet 22 and outlet 15 of valve 14, an increase in this pressure difference causing valve arrangement 40 to spill fuel from the inlet 22 to the upstream side of pump 12. Valve arrangement 40 also includes an evacuated bellows 42 responsive to the pressure $P_1$ at the compressor inlet of engine 10, an increase in pressure $P_1$ acting to reduce spill flow through valve arrangement 40.

A pressure relief valve 43 is connected in parallel with pump 12, and also in parallel with pump 12 is a governor arrangement 44 which is responsive to an increase, above a predetermined level, of engine speed N to open a valve 45 which spills fuel from the outlet to the inlet of pump 12. Valve 45 is biased shut by a spring 46 acting through a lever 47 and also by a piston element 48 which acts on lever 47 and is responsive to the pressure at the outlet of pump 12. The arrangement is such that the effects of increased pump delivery pressure on valve 45 are opposed by the bias from piston element 48. Governor arrangement 44 is thereby made dependent only on engine speed N.

I claim:

1. A flow control valve for liquids, comprising a body having an axial bore and an inlet port and an outlet port opening into said bore, a control member which is rotatable and axially slidable within said bore to control flow between said inlet and outlet ports, said control member being axially slidable in response to variations in a servo pressure signal, a control orifice opening onto a circumferential face of said bore, and means for rotating said control member, said control member having a generally axially-directed face which includes a portion which co-operates with said control orifice to define a pilot valve for controlling said servo pressure signal, an increase or decrease in said servo pressure signal as a result of rotation of said control member causing the latter to be urged in respective directions which decrease and increase said servo pressure signal.

2. A valve as claimed in claim 1 in which said control member portion is inclined to the normal to the axis of said control member, whereby rotation of said control member can cause variation of the amount of an overlap between said portion and said control orifice.

3. A valve as claimed in claim 2 in which said control member defines a metering edge which co-operates with one of said ports to regulate flow therethrough, said metering edge including a portion which is inclined to the normal to the axis of said control member, whereby rotation of said control member can cause variation of the amount of overlap between said metering edge and said one port.

4. A valve as claimed in claim 3 in which said means for rotating the control member includes means for setting said control member to a first angular position corresponding to a requirement to shut said valve, said one port being closed by said metering edge in said first angular position of said control member.

5. A valve as claimed in claim 4 in which said one port is said inlet port.

6. A valve as claimed in claim 5 in which said metering edge is angularly positioned relative to said land so that in said first angular position of said control member both of said ports are shut.

7. A valve as claimed in claim 6 which includes a passage communicating with said inlet port and opening into said bore at a location therein which is spaced axially from said inlet port, and in which said land and said metering edge are relatively angularly positioned so that in a second angular position of said control member said inlet port is shut and said passage communicates with said outlet port.

8. A valve as claimed in claim 7 in which said land, said metering edge and said control member portion are relatively angularly positioned so that in a third angular position of said control member said inlet and outlet ports intercommunicate, said control orifice being shut in said first, second and third angular positions.

9. A valve as claimed in claim 1 in which said control member includes means, operable in a predetermined rotational position of said control member, for isolating said inlet port from said outlet port in all axial positions of said control member.

10. A valve as claimed in claim 9 in which said isolating means comprises a land operable to shut said outlet port.

11. A valve as claimed in claim 1 which includes an adjustable abutment for limiting movement of said control member in response to said servo pressure signal.

12. A valve as claimed in claim 1 which includes means for applying to said control member a biasing pressure opposing said servo pressure signal.

13. A valve as claimed in claim 12 which includes means for rendering said biasing pressure responsive to the pressure at said outlet port.

14. A valve as claimed in claim 1 in which said means for rotating said control member comprises an electrical actuator.

* * * * *